US006430174B1

(12) United States Patent
Jennings et al.

(10) Patent No.: US 6,430,174 B1
(45) Date of Patent: *Aug. 6, 2002

(54) COMMUNICATION SYSTEM SUPPORTING SIMULTANEOUS VOICE AND MULTIMEDIA COMMUNICATIONS AND METHOD OF OPERATION THEREFORE

(75) Inventors: Darrell L. Jennings, Plano; Frederick W. Hansen, Murphy, both of TX (US)

(73) Assignee: Nortel Networks Ltd., St. Laurent (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/998,531

(22) Filed: Dec. 26, 1997

(51) Int. Cl.[7] ........................... H04L 12/66; H04L 12/28
(52) U.S. Cl. ..................... 370/352; 370/401; 379/88.13
(58) Field of Search ................................. 370/260, 261, 370/262, 255, 352, 401, 466; 379/265, 266, 309, 88.13, 93.07, 93.12, 88.14, 219; 348/13; 709/206

(56) References Cited

U.S. PATENT DOCUMENTS

| | | | | |
|---|---|---|---|---|
| 5,524,137 A | * | 6/1996 | Rhee | 379/67 |
| 5,768,513 A | * | 6/1998 | Kuthyar et al. | 395/200.34 |
| 5,796,791 A | * | 8/1998 | Polcyn | 379/265 |
| 5,812,865 A | * | 9/1998 | Theimer et al. | 395/800 |
| 5,884,032 A | * | 3/1999 | Bateman et al. | 395/200.34 |
| 5,884,262 A | * | 3/1999 | Wise et al. | 704/270 |
| 5,922,047 A | * | 7/1999 | Newlin et al. | 709/217 |
| 6,134,235 A | * | 10/2000 | Goldman et al. | 370/352 |

OTHER PUBLICATIONS

Mike Hurwicz, The Universal Inbox, Byte Magazine, Sep., 1997, pp. 75–79, McGraw Hill, Lexington, MA.

* cited by examiner

Primary Examiner—Alpus H. Hsu
Assistant Examiner—Duc Ho
(74) Attorney, Agent, or Firm—Bruce Garlick

(57) ABSTRACT

A communication system includes a voice subsystem and a multimedia subsystem. The voice subsystem couples to the PSTN and services a voice communication received by the communication system from a caller. The multimedia subsystem couples to the voice subsystem, supports multimedia communications and provides a multimedia interface to the caller upon receipt of the voice communication from the caller. When the call originates from a phone that supports multimedia communications, the multimedia subsystem directs the multimedia interface to the phone but, when the call originates from a phone that does not supports multimedia communications, the multimedia interface is directed to an associated multimedia enabled device. The voice subsystem provides call processing and routing functions as well as messaging functions and extended services. The multimedia subsystem includes an information posting subsystem and an information access subsystem that allow callers to post information and to access information. The multimedia subsystem may also include an application program interface subsystem that allows the caller to initiate execution of an application program on the multimedia subsystem. A universal inbox subsystem that receives, stores and delivers inbox items including voice messages, text messages and video messages via standard interchange protocols and languages. In operating the universal inbox, the multimedia subsystem supports delivery of all inbox items from the universal inbox subsystem to the caller via a standard transfer protocol. In such operation, the universal inbox subsystem converts inbox items to a standard format upon receipt. Methods of operation proceed according to the communication system described herein.

24 Claims, 13 Drawing Sheets

800

ENTERPRISE NETWORKS HOME PAGE

Welcome, You may choose from the following Options

Forward Call

Leave Message

Receive Messages

Post Information

Access Information

Launch Application

Hang Up

**MESSAGES FOR JOHN DOE
OF ENTERPRISE NETWORKS**

John Doe, You have the following
Messages in your Inbox:

Voice Mail

Voice Mail 1

Voice Mail 2

E-Mail

E- Mail 1

E-Mail 2

FAX

FAX 1

Data Files

Spreadsheet File 1

Word File 1

DB File 1

FIG. 9

**MESSAGE PAGE FOR
JOHN DOE
(972) 684-8983**

LEAVE MESSAGE:

Play Greeting

Leave Voice Message

Leave Email/Text Message

Leave FAX

Leave VideoMail

OTHER OPTIONS:

View John Doe's Schedule

View John Doe's Project

View Alternate Contacts for John Doe

Receive John Doe's Address Information

Route Call to Alternate Contact

Route Call to Corporate Operator

FIG. 10

ABC COMPANY
SALES DEPT.
(800) 999-9999

IDENTIFY YOURSELF:

Account Number

Caller Information Data

Agent Skill Requirements

PRODUCT INFORMATION:

Order By Catalog Number

Check Stock/Backorder Status

Alter Current Orders

Other Options:

Check Specials

---

*There are 12 Callers Ahead of You.*

*Approximate Time to Agent is 4 Minutes.*

Leave Message in Queue for Callback

FIG. 11

COMMUNICATION SYSTEM SUPPORTING SIMULTANEOUS VOICE AND MULTIMEDIA COMMUNICATIONS AND METHOD OF OPERATION THEREFORE

BACKGROUND

1. Technical Field

This invention relates generally to communication systems; and more particularly to a communication system that simultaneously supports both voice communications and multimedia communications to a single caller to provide various functions including answering a telephone call with an audio greeting coupled with a web page, and providing: universal inbox functions, call routing functions, technical support functions, messaging functions and information capture functions among other functions. A system constructed according to the present invention improves the quality of the experience a caller receives when a call is not completed to a human being.

2. Related Art

Voice communication systems are generally known in the art. Wired communication systems such as the public switched telephone network (PSTN) have been known for many years to service voice communications. Further, wireless communication systems such as the North American (NAM) cellular system, code division multiple access (CDMA) enabled cellular system, time division multiple access (TDMA) enabled cellular systems and global system for mobility (GSM) cellular systems are also generally known to service voice communications. However, voice communication systems could not be easily applied for data transfer functions. Thus, with the development and refinement of digital computers, data communication systems were developed.

Data communication systems are also generally known in the art. Local area networks (LANs), wide area networks (WANs), the Internet, intranet and asynchronous transfer mode (ATM) networks, for example, support the interchange of digital information between end point devices as well as between client computers and server computers. The client computer provides a powerful interface with which a caller may transmit and receive not only data but multi-media communications as well. With the growth of the Internet, many applications have been developed that use the Hyper Text Transfer Protocol (HTTP) and transfer data in the Hyper Text Markup Language (HTML) that support multimedia communications between server computers and client computers.

However, operation of data communication systems is generally dissimilar to that of voice communication systems. While in voice communication systems continuous bandwidth is typically provided in a time-switched fashion, data communication systems generally switch asynchronously to transfer packetized data. Thus, data communication systems are generally incompatible with voice communication systems such as the PSTN. Nonetheless, adaptations have been made which allow voice communication systems to provide data transfer functions and for data communication systems to provide voice services. For example, modems are commonly deployed in voice communication systems to transfer digital data over the voice communication systems. It is common for users of the Internet to connect to Internet service providers (ISPs) via dial-up links that serve to transfer digital data between the end user and the ISP.

Further, voice over Internet protocol (VOIP) applications serve to provide phone-like voice service over the Internet without PSTN long distance charges. In VOIP applications, voice signals are digitized and packetized at a sending location, transmitted via the Internet in a digital format to a receiving location where they are converted into analog voice signals and played to a called party. Thus, efforts have been made to merge the voice services provided by voice communication systems with the data transfer functions typically provided by data communication systems. As evident, the merging of such dissimilar technologies has provided limited benefits.

Other difficulties arise when functions provided by data communication systems are attempted to be merged with functions provided by voice communication systems. For example, voice mail is typically left on a voice communication system and received via the voice communication system. However, email and data files are typically received via a data communication system. Moreover, facsimile transmissions may be received by either the voice communication system or the data communication system. Since these messages are received in dissimilar formats, a client must receive the messages either from a multi-media enabled computer or from both a telephone, to receive the voice mail, and a computer system to receive the electronic mail, digitized facsimiles and data files. Because the messages arrive in dissimilar formats, a client computer receiving the messages must execute specialized software to merge the messages into a common format or into a set of formats supported by the client computer. Substantial overhead is consumed in the client computer to simply receive and merge the messages.

Other limitations involve voice communication systems themselves. In many organizations, callers are greeted by, or transferred to an automatic call answering/routing system through which they must provide input to reach a desired extension or a desired service. To execute commands within the call answering system, the caller typically uses the touch tone pad. However, due to the limited number of keys and the difficulty of both listening and pressing the keys, callers have difficulty using the automatic call answering/routing system.

Another limitation of voice communication systems involves the manner in which communication is accomplished when a called party is not available. If the caller desires to leave a message to the called party, the message must be left in a voice format. If a caller desires to know the whereabouts of a called party, the caller will typically be unable to determine any further information without communicating with a representative of the called party. Thus, when a called party cannot be found, the caller is left with few options.

Thus, there exists a need in the art for an improved communication system that combines the benefits of voice communication systems with the benefits provided by data communication systems.

SUMMARY OF THE INVENTION

Thus, to overcome the above described shortcomings of the prior devices among other shortcomings, a communication system constructed according to the present invention supports both voice and multimedia communications. The communication system allows callers to receive multimedia information and provides a multimedia input vehicle for callers to interact with the communication system. In providing these benefits, the communication system answers telephone calls with a web page presented to the caller. The web page allows the caller to receive and send multimedia information to the communication system and associated application servers.

The communication system includes a voice subsystem and a multimedia subsystem. The voice subsystem couples to the PSTN and services a voice communication received by the communication system from a caller. The multimedia subsystem couples to the voice subsystem and supports multimedia communications. In supporting multimedia communications, the multimedia subsystem provides a multimedia interface to the caller upon receipt of the voice communication from the caller. Based upon interaction with the caller thereinafter, the multimedia subsystem supports communication functions via the multimedia interface.

When placing a call to the communication system the call may originate from a multimedia enabled device or from a device that is not multimedia enabled. When the call originates from a phone that supports multimedia communications, the multimedia subsystem directs the multimedia interface to the phone. However, when the call originates from a phone that does not support multimedia communications, the multimedia interface is directed to an associated multimedia enabled device. When first calling the communication system, the caller may designate a multimedia enabled device to receive the multimedia interface. The multimedia enabled device can be identified by the via Digit Tone Multi Frequency (DTMF) tones from the calling telephone set. Then, after designating the device, in subsequent calls, the communication system automatically directs the multimedia communication to the designated device.

The voice subsystem may include a switch that is capable of routing the call to one of a plurality of destination devices coupled to the voice subsystem. In operation of the switch, calls may also be sent directly to the voice subsystem without a further intended destination so that the caller directly accesses the multimedia capabilities of the communication system. The voice subsystem may provide call processing and routing functions as well as messaging functions. The voice subsystem may also provide extended services, some of which are intended for service with phones that are not multimedia enabled.

In one embodiment, the multimedia subsystem comprises a server computer that couples not only to the voice subsystem but to the Internet, an intranet, a wireless network and to other resources. The multimedia subsystem may include an information posting subsystem and an information access subsystem that allows callers to post information and to access information. The multimedia subsystem may also include an application program interface subsystem that allows the caller to initiate execution of an application program on the multimedia subsystem.

In still another embodiment, the communication system includes a universal inbox subsystem that receives, stores and delivers inbox items including voice mail, electronic mail, video mail, text mail and facsimiles. In operating the universal inbox, the multimedia subsystem supports delivery of all inbox items from the universal inbox subsystem to the caller via a standard transfer protocol. In such operation, the universal inbox subsystem converts inbox items to a standard format upon receipt. Methods of operation proceed according to the communication system described herein. Moreover, other aspects of the present invention will become apparent with further reference to the drawings and specification which follow.

BRIEF DESCRIPTION OF THE DRAWINGS

FIG. 8 is a diagram illustrating a multimedia interface provided to a caller that allows a caller to select functions of the communication system of the present invention;

FIG. 9 is a diagram illustrating an interface provided by the communication system of the present invention to a caller when providing universal inbox functions;

FIG. 10 is a diagram illustrating an interface provided by the communication system of the present invention to a caller when providing messaging functions;

FIG. 11 is a diagram illustrating an interface provided by the communication system of the present invention to a caller that has accessed a central receiving location of an organization;

DETAILED DESCRIPTION OF THE DRAWINGS

Figure 1:
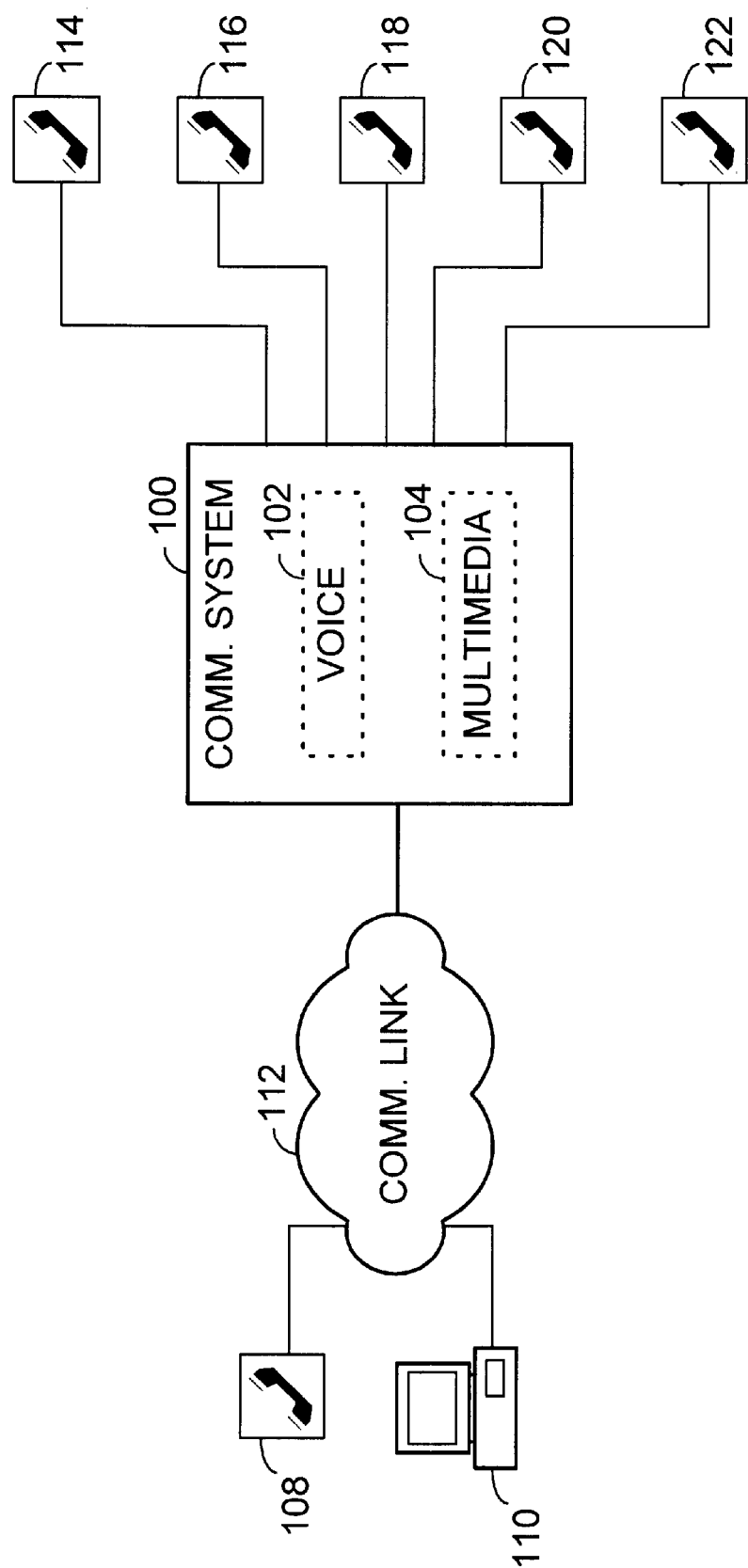
FIG. 1 is a block diagram illustrating a communication system constructed according to the present invention that supports both voice and multimedia communications, the communication system responding to a voice communication with a multimedia interface, the multimedia interface provided to a multimedia enabled phone that calls the system or to a computer designated to receive the multimedia interface when a call is received from a related phone.

FIG. 1 illustrates a communication system 100 constructed according to the present invention that supports both voice and multimedia communications. The communication system 100 includes a voice subsystem 102 a multimedia subsystem 104. A caller calls the communication system 100 from a terminal 108 via communication link 112. Upon receipt of the call from the end point device 108, the communication system 100 determines whether the call should be routed to a destination device 114, 116, 118, 120, or 122.

Further, upon receipt of the call from the end point device 108, the communication system 100 may determine whether the end point device 108 is multimedia enabled and respond with a multimedia interface via the communication link to the end point device. Such operation would typically be performed when the communication system 100 does not deliver the call to a desired destination device or when the caller dials a number designated for multimedia interface communications. Should the end point device 108 not be multimedia enabled, the communication system 100 seeks an alternate destination associated with the end point device 108 to deliver the multimedia interface. As illustrated, computer 110 is associated with end point device 108. In an operation wherein the end point device 108 is not multimedia enabled, the communication system 100 determines such and provides the multimedia interface to the computer 110 via the communication link 112.

As will be further described herein, the communication link 112 may include simply a PSTN connection, simply a wired network connection, simply a wireless network connection or any combination of these. For example, should the end point device 110 be a multimedia enabled Voice Over Internet Protocol (VOIP) phone serviced by a computer, the communication link 112 comprises simply an Internet connection. In another example, where the end point device 108 is a JAVA enabled phone, the communication link 112 comprises simply the PSTN.

Should the caller that is calling from the end point device 108 desire to converse with a called party served by one of the other end point devices 114–122, the voice subsystem 102 attempts to deliver the call. If delivered, the conversation is serviced until it is complete. Simultaneously, the caller may execute functions provided by the communication system 100 via the multimedia unit 104. Further, when the conversation is completed, the caller may further interface with the communication system 100 to perform other functions.

The communication system 100 of the present invention may be used simply to access the various functions provided therein. Thus, the caller need not attempt to connect a call to one of the destination end point devices 114–122. Functions provided include universal inbox functions, messaging functions, information posting and receipt functions, application program interface functions, and various other functions that may be supported by a multimedia enabled end point device 108 or related computer 110 that is multimedia enabled.

Thus, the communication system 100 provides the advantages of both voice communication system devices such as private branch exchanges and data communication system servers such as a web server coupled to the Internet or a server coupled to a company's intranet, local area network (LAN) or wide area network (WAN). The communication system 100 may be constructed to be fully compliant with JAVA enabled phones, JAVA being a software language supported by Internet protocols and languages.

The communication system 100 provides support to both stationary and portable multimedia enabled phones 108 as well as to the multimedia enabled computer 110. Over wired links, the communication system 100 supports HTTP/HTML applications among others. Further, over wireless links, the communication system 100 supports protocols and languages supported extend to the Handheld Device Transfer Protocol (HDTP) and the Handheld Device Markup Language (HDML). JAVA enabled phones may also support these protocols and languages. Thus, when accessing the communication system 100, the JAVA enabled phones provide functionality somewhat comparable to that provided by a multimedia enabled computer 110.

Figure 2A:
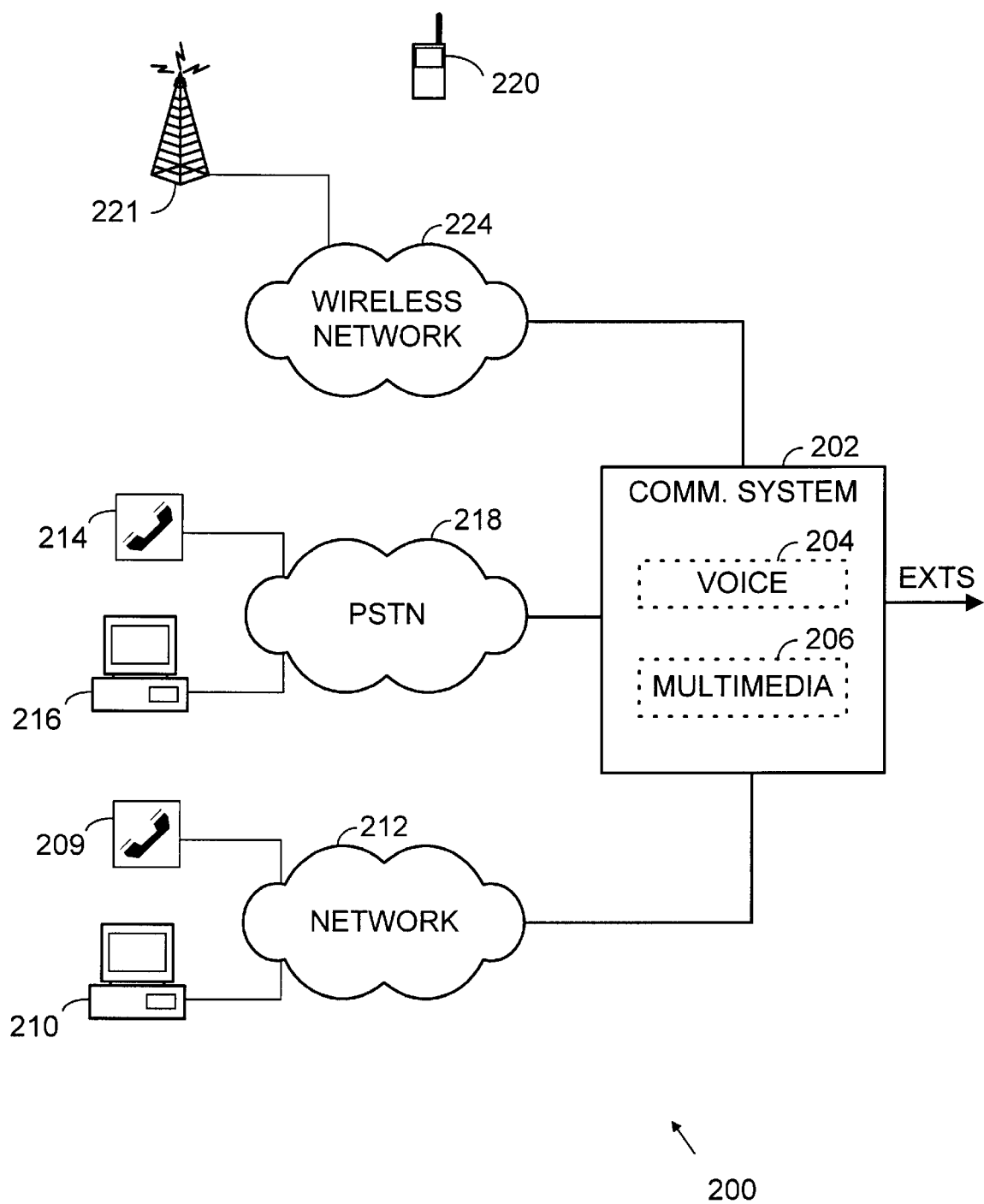
FIG. 2A is a block diagram illustrating an alternate embodiment of a communication system constructed according to the present invention in which the communication system couples to a network, to the public switched telephone network (PSTN), to a wireless network and to a plurality of extensions.

FIG. 2A is a block diagram illustrating an alternate implementation 200 of a communication system 202 constructed according to the present invention. As is shown, the communication system 202 includes a voice subsystem 204 and a multimedia subsystem 206. The communication system 202 couples to a network 212, the PSTN 218 and a wireless network 224. However, while the wireless network 224 is shown directly connected to the communication system 202, the communication system could connect to the wireless network 224 via the PSTN 218. Further, while the PSTN 218 and the network 212 are shown as separately connected entities, in some embodiments, the PSTN 218 and the network 212 share some resources, particularly when the PSTN 218 services some internet and intranet paths.

The communication system 202 also couples to a plurality of extensions to which calls may be delivered and from which calls may originate. The network 212 may include a LAN, a WAN, the Internet and/or other premises based or wide area networks. The wireless network 224 may include a cellular network, a premises based wireless network such as the Nortel Meridian Companion and/or another wireless network providing wireless communication capability.

Telephone 209 and computer 210 couple to a network 212 through which they couple to the communication system 202. The telephone 209 supports voice over Internet protocol (VOIP) communications or other protocol to service voice communications through the network 212 to the communication system 202. Should the telephone 209 be multimedia enabled, it will receive a multimedia interface upon accessing communication system 202 via the network 212. If the telephone 209 is not multimedia enabled, upon receiving a call from the telephone 209, the communication system 202 will determine it is not. Then the communication system 202 determines whether a multimedia enabled device has been designated to receive multimedia communications when the telephone 209 dials the communication system 202. If so, the communication system 202 delivers a multimedia interface to the designated device. While FIG. 2A shows computer system 210 residing adjacent telephone 209, computer 216 coupled to the communication system 202 via the PSTN 218 could also be designated to receive multimedia communications when telephone 209 calls communication system 202.

Additional operation is required when the computer 216 is designated to receive multimedia communications initiated by a call from telephone 209 to the communication system 202. In one implementation, a JAVA applet running on the computer 216 operates in conjunction with the telephone 209 via a physical connection. In another implementation, when the telephone 209 accesses the communication system 202, the communication system 202 places a call to the computer 216 via a designated dial number.

As shown, the communication system 202 also couples to the PSTN 218. Telephone 214 may call the communication system 202 via the PSTN 218. In such case, the communication system 202 also determines whether the telephone 214 is multimedia enabled. If it is, the multimedia unit 206 of the communication system 202 delivers a multimedia interface to the telephone 214. However, if telephone 214 is not multimedia enabled, the communication system 202 attempts to deliver a multimedia interface to a designated computer or other multimedia enabled device. For example, computer 210 or computer 216 may be designated to receive multimedia information when a call is made from telephone 214.

In some installations, the telephone 214 is JAVA enabled and has a physical connection to the computer 216. Running on the computer 216 is a JAVA applet that allows the telephone 214 to interface with the JAVA enabled telephone 214. In the embodiment, the telephone 214 and the computer 216 may share a single physical connection to the PSTN 218 over which both voice and data communications are transmitted. However, in another embodiment, the telephone 214 and the computer 216 may each have a separate connection to the PSTN 218, the voice communications supported by one of the connections and the data communications supported by the other connection. Further, while the voice communications may be serviced by the PSTN 218, the data communications may be serviced by the network 212 or even the wireless network 224 so that both voice communications and data communications may be serviced.

The communication system 202 also couples to the wireless network 224. A mobile terminal 220 communicates with the wireless network 224 via a base transceiver station (BTS) 221 and other infrastructure associated with the wireless network 224. Thus, when mobile terminal 220 initiates communication with the communication system 202 via the wireless network 224, the multimedia subsystem 206 of the communication system 202 attempts to deliver a multimedia interface to the mobile terminal 220. Should the mobile terminal 220 support HDTP/HDML communications, for example, the multimedia device 206 determines such and delivers the multimedia interface to the mobile terminal 220.

While providing the multimedia interface, the voice subsystem 204 services voice communication with the mobile terminal 220. Further, as was the case with telephones 209 and 214, the communication system 202 may deliver a communication originating with the mobile terminal 220 to a destination extension connected to the communication system 202. However, should such a connection not be required, the mobile terminal 220 interfaces directly with the communication system 202 to execute one or more functions supported by the communication system 202.

Figure 2B:
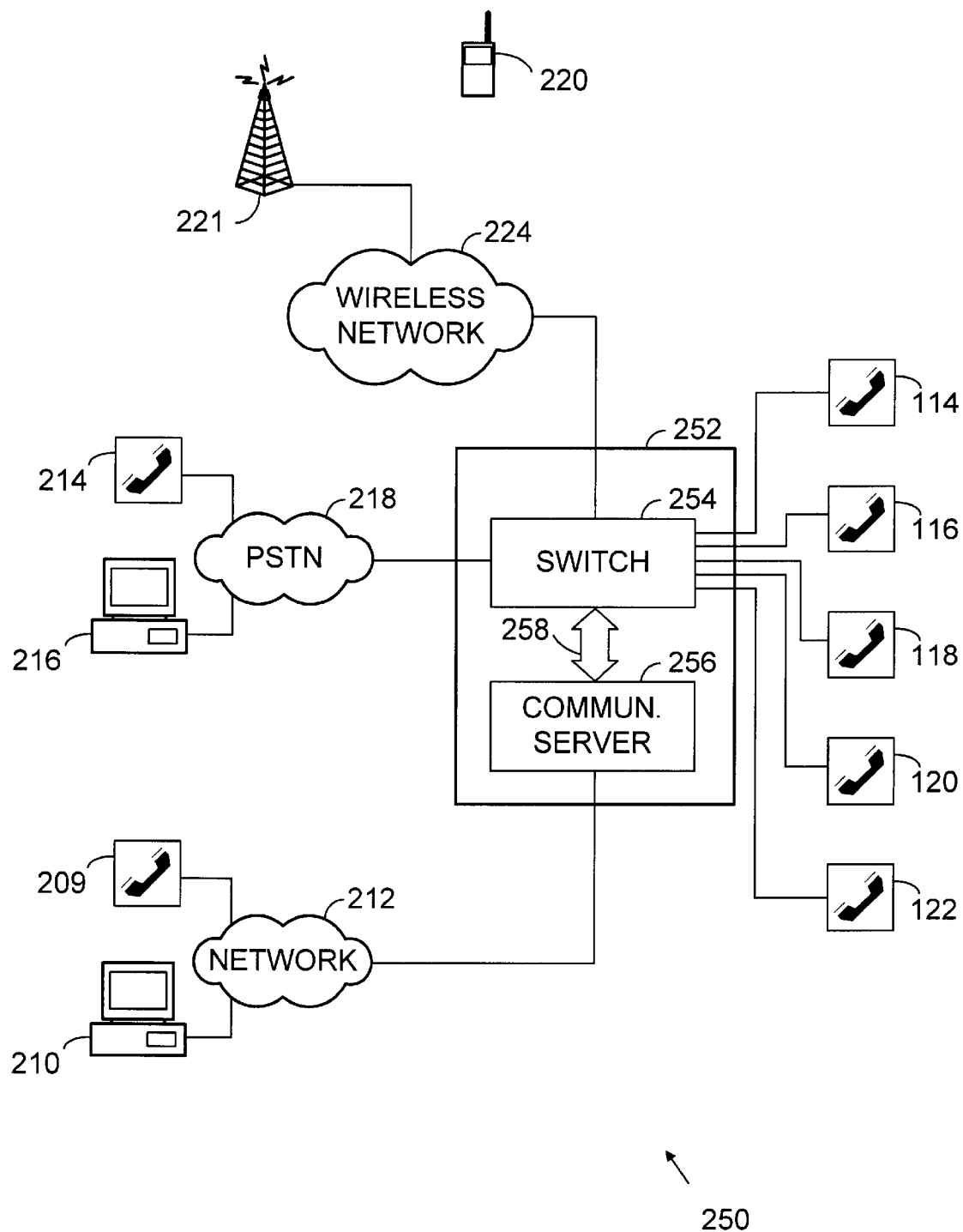
FIG. 2B is a block diagram illustrating another alternate embodiment of a communication system constructed according to the present invention showing functionally the connections provided by the communication system to a network, the PSTN, to a wireless network and to the plurality of extensions.

FIG. 2B illustrates another alternate embodiment of installation 250 of a communication system 252 constructed according to the present invention showing functionally the connections provided by the communication system to the network 212, the PSTN 218, to the wireless network 224 and to the plurality of extensions 114–122. Numbering convention is retained for those elements previously described with respect to FIGS. 1 and 2A. Those elements will not be described again with respect to FIG. 2B except as to clarify the additional principles presented.

The communication system 252 includes a switch 254 and a communication server 256 coupled by a bi-directional, high-speed link 258. The switch 254 may be a private branch exchange (PBX) such as a Meridian™ PBX manufactured and sold by Northern Telecom Limited or related company. The switch 254 may also be a telephone company central office switch such as a DMS-100 sold by Nortern Telecom or a similar switch. The communication server 256 may include a digital computer constructed on a circuit contained within the circuitry of the switch 254 or may be a digital computer housed apart from the switch 254 and connected via the bi-directional, high-speed link 258. Both the switch 254 and the communication server 256 will be described further herein with reference to FIGS. 4 and 5, respectively.

The switch 254 couples to the PSTN 218 and to the wireless network 224 to service communications received therefrom. The switch 254 also couples to the extensions 114–122 to service calls intended for the extensions 114–122 and also to service calls originating from the extensions 114–122. The switch 254 also services calls originating from or delivered to the wireless network 224. Further, the communication server 256 couples to the network 212 and services communications between the network 212 and the communication system 252.

Figure 3:
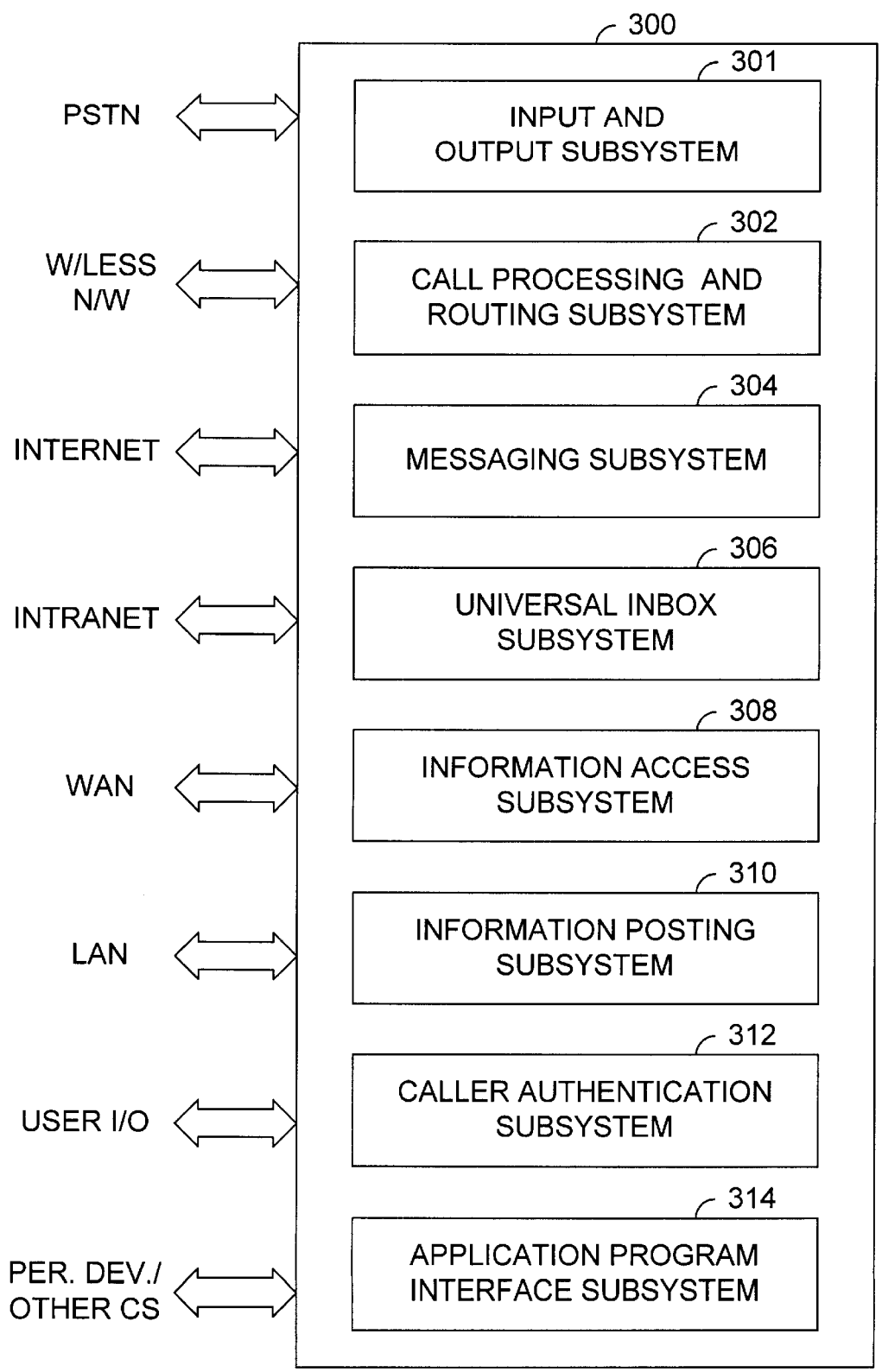
FIG. 3 is a block diagram illustrating the functional components of a communication system constructed according to the present invention.

FIG. 3 illustrates functionally the construction of a communication system 300 according to the present invention. As is shown, the communication system 300 includes various subsystems to support its intended functions and various interfaces that allow it to couple to differing media. As shown, the communication system 300 may couple to the PSTN, to a wireless network, to the Internet, to an intranet, to a wide area network (WAN), to a local area network (LAN), to a peripheral device or other communication system or to user input/output devices.

The communication system 300 includes a call processing and routing subsystem 302. The call processing and routing subsystem 302 provided functions similar to those that may be provided by a private branch exchange (PBX) or other switch serving an organization or enterprise. The communication system 300 also includes a messaging subsystem 304. The messaging subsystem 304 supports voice, fax, email, and other types of messages that may be intended for a called party. The messaging subsystem 304 allows a caller connecting to the communication system 300 to leave messages for a particular called party, a particular person or for a group of persons. The messaging subsystem 304 also allows a caller to leave messages for an intended called party that later accesses the communication system 300. In this fashion, upon authentication of a particular caller accessing the communication system 300, certain messages may be provided for the caller that have been created for the purpose of delivery to the particular caller.

The communication system 300 also includes a universal inbox subsystem 306. The universal inbox subsystem 306 receives messages and communications in various formats. For example, universal inbox subsystem 306 may receive messages that were received by the communication system 300 by the messaging subsystem 304. The universal inbox subsystem 306 may receive data files, faxes, emails, and other types of information intended for a particular called party or group of called parties. The universal inbox subsystem 306 is a server based application that allows such inbox items to be received by a caller via a simple common interface.

For example, as was previously described, the communication system 300 may be accessed by multimedia enabled phones. These phones would communicate with the universal inbox subsystem 306 using communication protocols they support. Further, the communication system 300 may be accessed by a computer coupled via the Internet. The computer may have a browser that supports communications transferred in the HTTP protocol in HDML language and supports the various common interfaces provided in Internet communications. These devices then interface the universal inbox subsystem 306 to receive inbox items using a single interface and in a single format type.

Operating in his fashion, the resources required to convert communications to the common language are resident within the communication system 300 and no separate application programs are required in the client calling communication system 300 to manage the different types of items in the inbox. As compared to prior universal inboxes which required application programs running on the client, the universal inbox subsystem 306 of the communication system 300 of the present invention supports a wide variety of services and message types but does not require specialized client software. For example, an HTML or HDML browser or other multimedia enabled interface may be used as an application program that receives all items in the inbox.

An information access subsystem 308 interfaces with a caller to allow the caller to access various information that may be stored in the communication system 300 or in other resources coupled to the communication system 300. The information access subsystem may support technical information databases, information related to specific portions of an organization, product information, product pricing, product delivery options, product delivery times, and such other information that an organization would desire to disseminate in an efficient manner.

The communication system 300 also includes an information posting subsystem 310 which allows a caller connected to the communication system 300 to post information in the communication system 300. The types of information that may be collected by the information posting subsystem 310 include product preferences, call center agent skill preferences, comments from group members regarding a product, data that will be implemented in a common presentation or design and other information that is desired to be collected at a central location. Because the communication system 300 is accessed by a uniform interface, information posting subsystem 310 may efficiently collect information posted and store it for further reference.

The communication system 300 further includes a caller authentication subsystem 312 which is used to determine the privileges to be provided to a caller. The caller may be authenticated based upon a previously assigned password, voice recognition or another available authentication tool. Once the caller has been authenticated by the caller authentication subsystem 312 the caller will be allowed to execute functions consistent with the commensurate privileges provided to the caller may be provided by the communication system 300.

Finally, the communication system 300 includes an application program interface subsystem 314. The application program interface subsystem 314 allows a caller to remotely execute an application program. Such application program may include a spreadsheet program, a database program, a messaging program, a calendar program, or another type of program that is resident on or accessible by the communication system 300 but not resident on the caller's device.

The subsystems 302–314 of the communication system 300 may be included within the switch 254 and the communication server 256 of the communication system 252 described with reference to FIG. 2B. Depending upon the particular installation and the particular subsystems 302–314, the functions provided therein may be provided singularly by either the switch 254 or the communication server 256. However, should the functions provided by a particular subsystem require participation of both the switch 254 and the communication server 256, the subsystem will be implemented jointly within the switch 254 and the communication server 256. In some installations, specialized hardware may be required to accomplish the functions of the present invention. However, in other installations, specialized programming of existing hardware resources will accomplish such functions. Thus, in some installations, the principles of the present invention may be accomplished by specialized hardware while in other installations, the principles of the present invention may be accomplished by generalized hardware that has been specially programmed.

Figure 4:
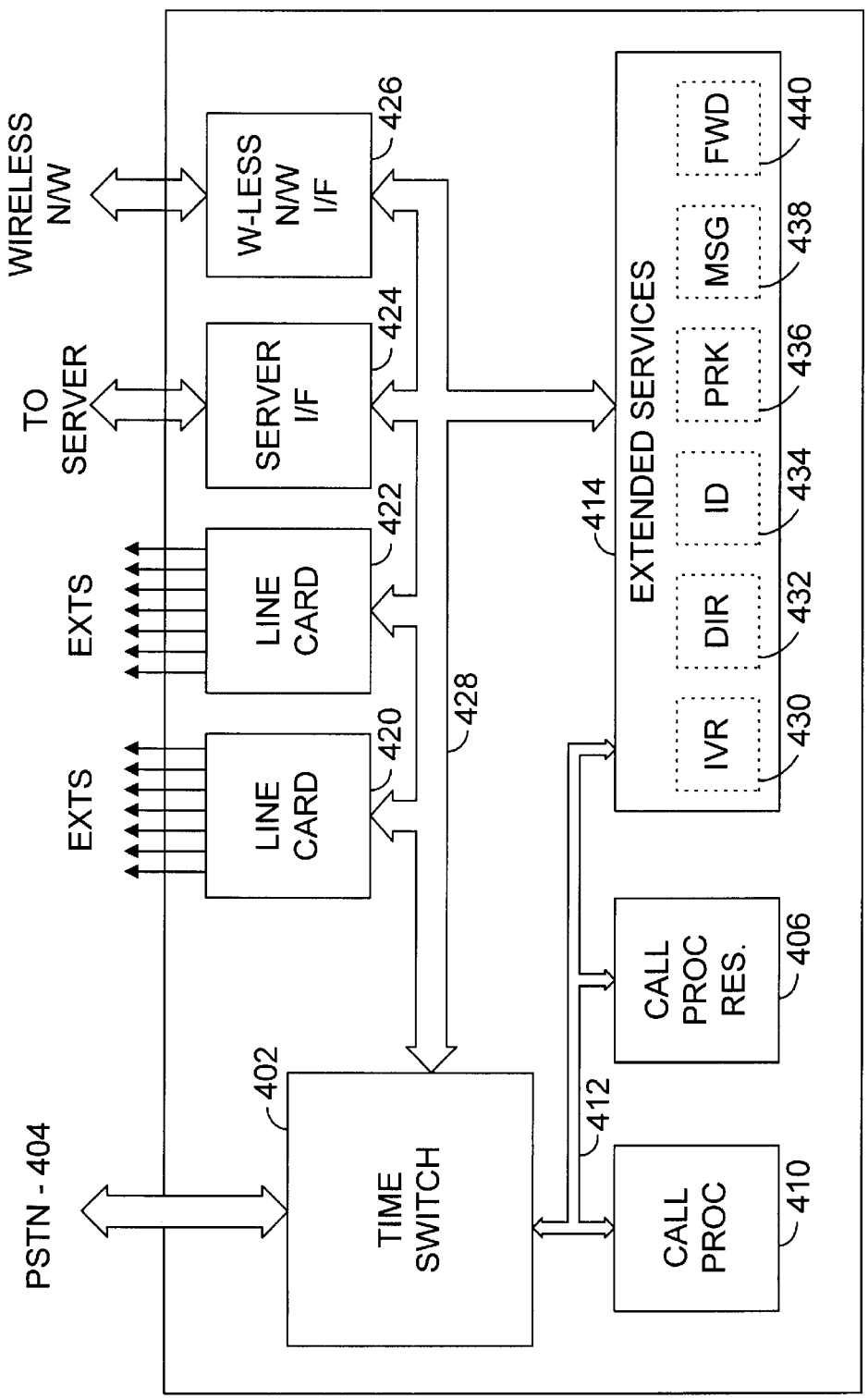
FIG. 4 is a block diagram illustrating a switch constructed according to the present invention that provides time based switching and extended services for voice communications received from the PSTN or another telephone network.

FIG. 4 illustrates an embodiment of a switch 400 contained within a communication system constructed according to the present invention. The switch 400 includes a time switch 402, call processor 410, call processing resources 406, extended services unit 414, line cards 420 and 422, server interface 424, and a wireless network interface 426.

The time switch 402 couples the switch 400 to the PSTN 404. The time switch 402 also couples to the line cards 420 and 422 which connect the switch to extensions connected to end point devices served by the switch 400. The server interface 424 couples the switch 400 to a communication server which will be discussed with reference to FIG. 5. The wireless network interface 426 couples the switch to a wireless network. The wireless network may be a cellular system such as that illustrated in FIG. 2A or may be a premises based wireless network in which communications are jointly supported by the switch 400 and a wireless infrastructure. The line cards 420 and 422, the server interface 424, and the wireless network interface 426 couple to the time switch 402 via bus 428. The bus 428 also couples extended services 414 to the time switch 402.

Call processor 410 and call processing resources 406 coupled to the time switch via control bus 412 control operation of time switch 402. The extended services 414 include interactive voice response (IVR) 430, directory services 432, identification services 434, call parking services 436, call messaging services 438 and call forwarding services 440. These extended services 414 may be provided separate from or in conjunction with the multimedia services provided by the communication system. For example, should a caller calling from a phone that does not support multimedia communications call the communication system 300, the extended services 414 may be provided by the switch 400. However, in other operations, similar extended services may be provided by the communication server illustrated in FIG. 5.

Figure 5:
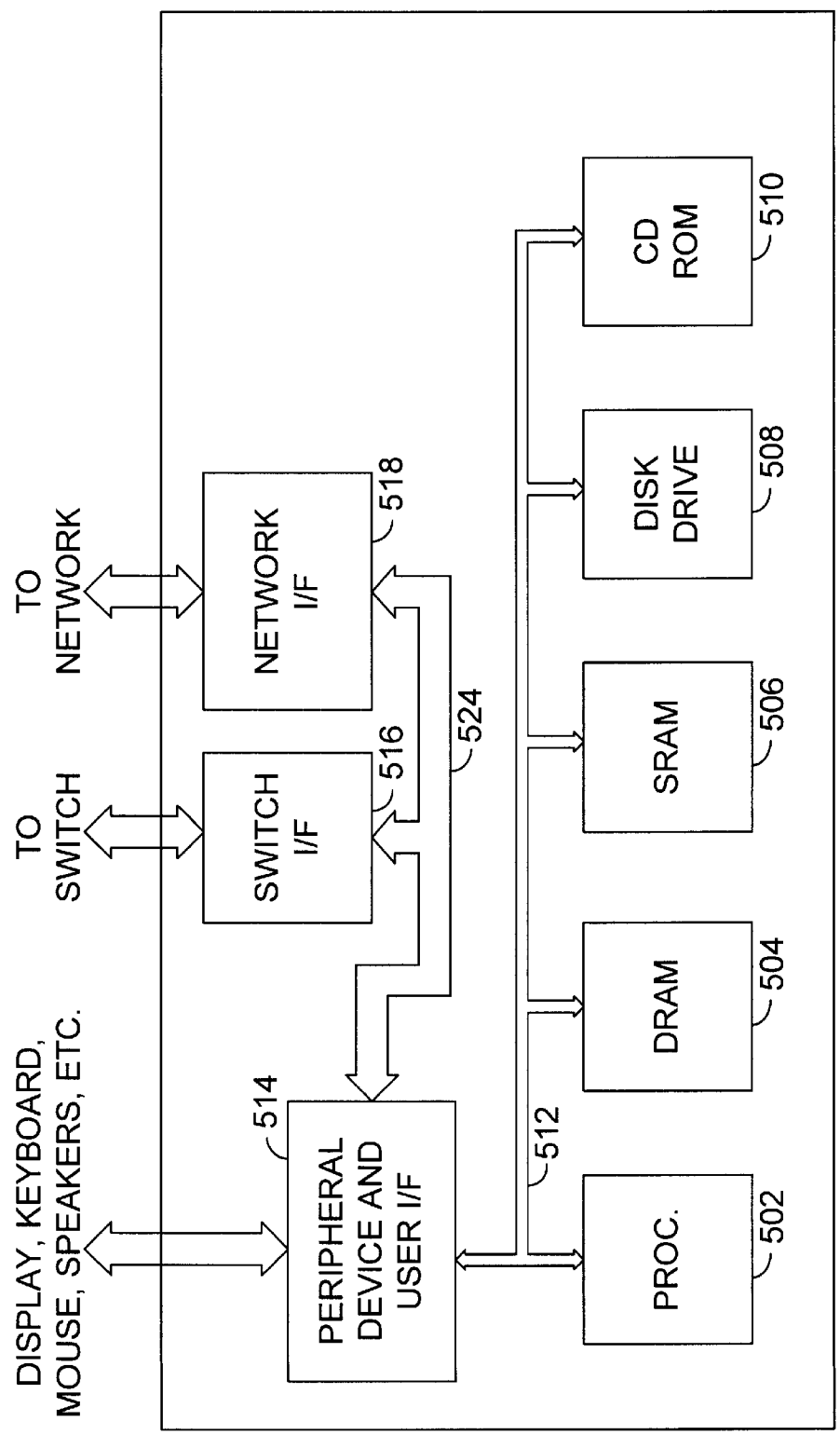
FIG. 5 is a block diagram illustrating a computer server constructed according to the present invention that provides multimedia communications to multimedia enabled phones calling the system and to coupled computers, the computer server also providing universal inbox functions.

FIG. 5 illustrates a communication server (server) 500 that forms part of a communication system constructed according to the present invention. The server 500 includes a processor 502, dynamic random access memory (DRAM) 504, static random access memory (SRAM) 506, a disk drive 508, and a CD ROM drive 510 coupled to a peripheral device and user interface 514 via bus 512. Processor 502, DRAM 504, SRAM 506, disk drive 508, and CD ROM 510 are generally known in the art. Thus, such components will not be further described herein except as to amplify upon the principles of the present invention.

The peripheral device and user interface 514 provides an interface between the processor bus 512 and the various components connected to a peripheral bus 524 as well as to user interface components such as display, keyboard, mouse, speakers, and other user interface devices. A switch interface 516 and a network interface 518 couple to the peripheral bus 524. The switch interface couples the server 500 to the switch 400 illustrated in FIG. 4. Further, the network interface couples the server 500 to the network 212 of FIGS. 2A and 2B, for example. Thus, the network interface 518 provides the server 500 with access to LANs, WANs, intranets, the Internet and other networks accessible via the network 212. Each of these interfaces 516 and 518 may comprise a peripheral component card coupled to a standardized peripheral bus 524.

When executing program instructions written according to the principles of the present invention, the server 500 provides a multimedia interface to a multimedia enabled phone or related multimedia enabled device when a caller calls the communication system. Thus, program instructions may be written that are executed by both the switch 400 illustrated in FIG. 4 and the server 500 illustrated in FIG. 5. Such program instructions are written in languages consistent with the switch 400 and the server 500. Such programming languages are known in the art and will not further be described herein. As one will appreciate, program instructions that cause the server 500 to operate in a manner consistent with the present invention may be stored on the CD ROM 510, disk drive 508, SRAM 506, and/or DRAM 504.

Figure 6:
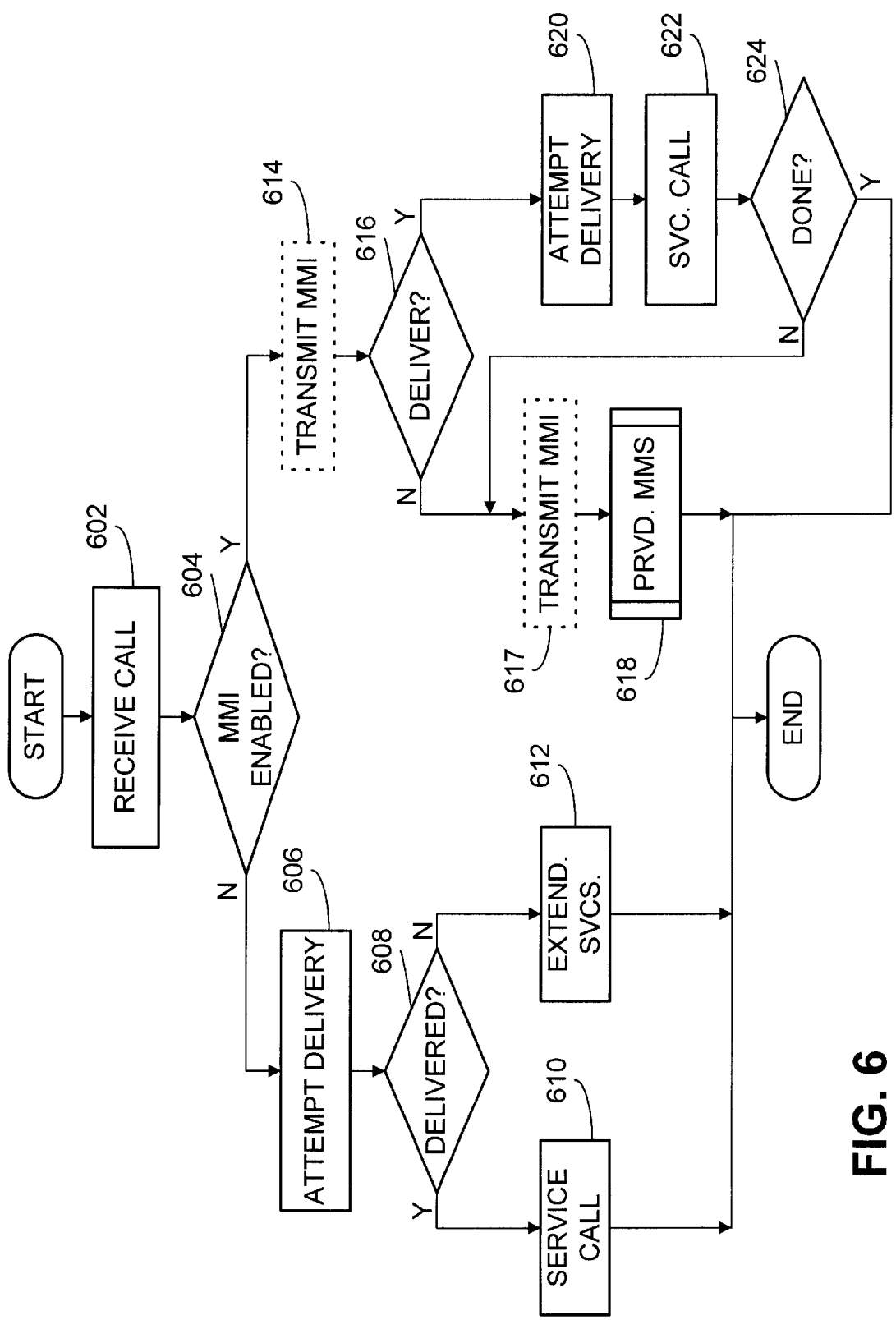
FIG. 6 is a logic diagram illustrating operation of a communication system constructed according to the present invention in receiving calls, responding to the calls with a multimedia interface when appropriate and providing other functions based upon caller input.

FIG. 6 illustrates general operation of a communication system constructed according to the present invention. Operation commences at step 602 wherein the communication system receives a call. Upon receipt of the call at step 602, the communication system determines whether the phone used by the caller to call the communication system is multimedia enabled or whether a multimedia enabled device has been identified to receive the multimedia interface when the caller calls the communication system using the phone. For example, upon receiving an incoming call, the communication system may query the caller's phone to determine what multimedia capabilities the phone has, if any. Further, a non-multimedia enabled phone may be automatically queried to provide a telephone number, Internet Protocol (IP) address, Universal Resource Location (URL) or other identifier which may be used to access a multimedia enabled device designated to receive the multimedia communications. Alternately, upon receipt of a call from a particular endpoint device, the communication system may determine whether a multimedia enabled device has previously been associated with the caller's endpoint device in a resident cross-reference table. If no entry is present for the caller's endpoint device, the communication system may query the caller to identify such an associated multimedia enabled device.

If the caller's phone is not multimedia enabled and no multimedia enabled device is identified for delivery of the multimedia interface, operation proceeds to step 606 wherein the call is attempted to be delivered to a destination device. If the call is delivered at step 608, the call is serviced at step 610 until it is completed at which point operation ends. However, if at step 608 the call could not be delivered to an intended destination device, operation proceeds to step 612 wherein the extended services provided by component 414 of the switch 400 of FIG. 4 are provided to the caller. Since it has been determined that multimedia interface communications are not possible with the caller's phone, the extended services are provided at step 612 in a manner consistent with the capabilities of the caller's phone. From step 612, operation ends.

If at step 604 the communication system determines that multimedia communications are enabled by the calling (or related) device, operation proceeds to step 614 wherein the communication system may deliver a multimedia interface to caller's phone or designated multimedia device. Then, operation proceeds to step 616 wherein the communication system determines whether the call is to be delivered. If the call was made simply to the communication system without a specific end point device indicated, the communication system proceeds through step 617 to provide the multimedia services at step 618. Operation associated with step 618 will be described further herein with respect to FIGS. 7A and 7B. Once such multimedia services are provided at step 618, operation ends.

If at step 616, it is determined that delivery of a call should be attempted, delivery is attempted at step 620. If the call is delivered, it is serviced at step 622. However, if the call is not delivered, operation proceeds through step 622 to step 624. Further, if the call is delivered, operation will proceed to step 624 when the conversation is concluded. Once the conversation is concluded, the communication system determines whether the caller desires continued interaction with the communication system. If the caller does not and is done at step 624, operation ends. However, if the caller is not done interacting with the communication system, operation proceeds to step 617 where the multimedia interface is delivered to the caller if it has not already been delivered. Then, from step 617, operation proceeds to step 618.

Figure 7A:
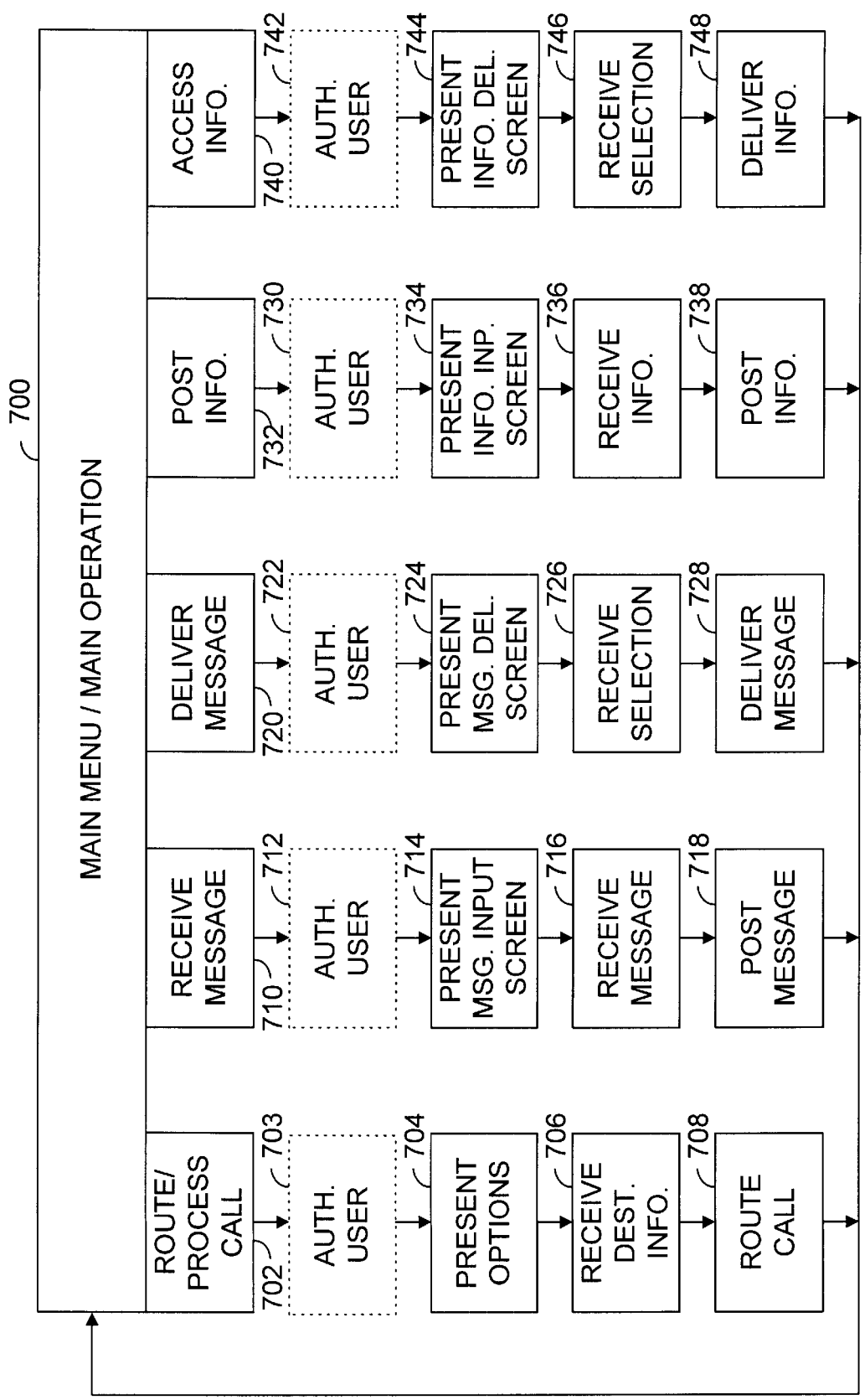
FIGS. 7A and 7B are logic diagrams illustrating operation of a communication system according to the present invention in providing a caller with a multimedia interface and in executing supported functions based upon caller input.
Figure 7B:
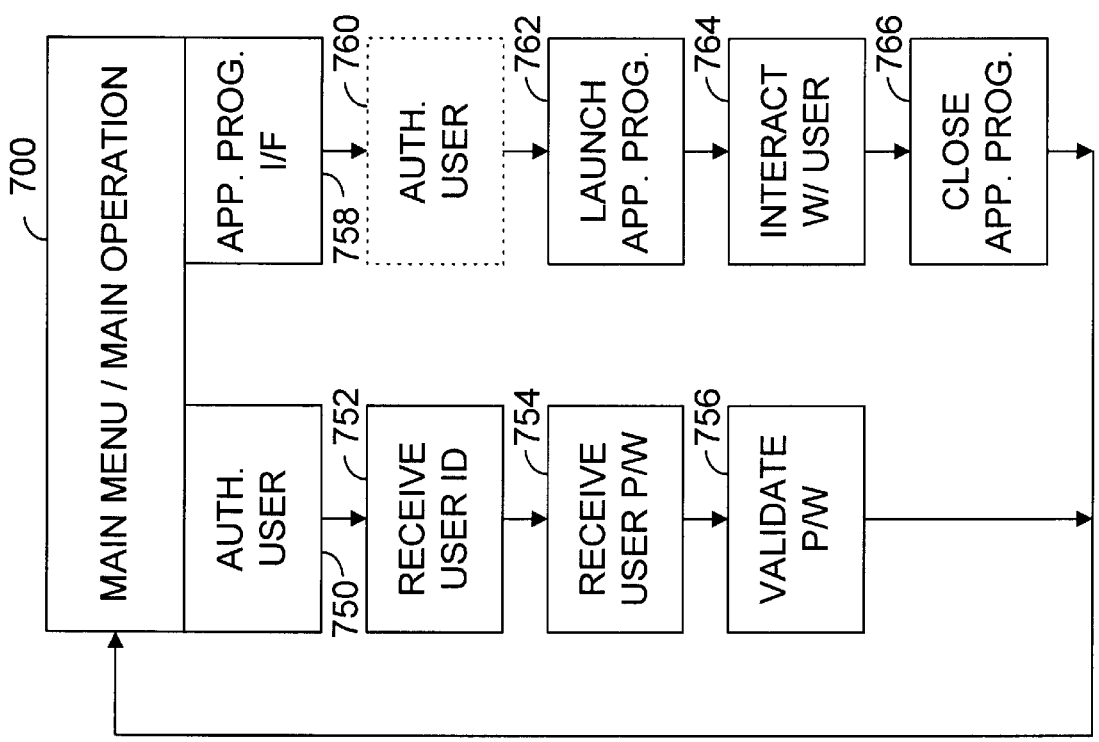

FIGS. 7A and 7B illustrate operation of the communication system of the present invention. Operation proceeds primarily from a main menu or state 700. In a first subgroup of operations commencing at step 702, the caller desires to route or process a call and operation proceeds to step 702. However, operation may automatically proceed to step 702 given a corresponding set of input conditions. From step 702, operation proceeds to step 703 wherein the caller is authenticated by the communication system. Such authentication may require the caller to provide a password or other means of insuring the caller has access to the system resources provided by the communication system.

From step 703 operation proceeds to step 704 wherein options are provided to the caller for routing the call. Such options for routing may present a listing of people available for delivery, options for forwarding the call to a pager, a cell phone, an alternate telephone set, or even an alternate web page designated for a person, group or other segment of the organization. In a retail sales environment, for example, the options presented at step 704 may allow a caller to deliver the call to a particular department or specialty portion of the organization. Alternately, the options presented at step 704 may allow the call to be delivered to a person of particular language skills, technical knowledge, or other resources that are desired by the caller. The list of options presented at step 704 are based upon the authentication that was performed at step 703. From step 704 operation proceeds to step 706 wherein the communication system receives destination information from the caller. Based upon this destination information, the call is routed at step 708 to a desired location. Operation at step 708 is similar to operation previously described at step 620 of FIG. 6. Thus, from step 708, operation could proceed to step 700 of FIG. 7 as well as to step 622 of FIG. 6.

Referring again to FIG. 7, from main operation at step 700 the caller or system may operate the communication system to receive a message at step 710. Next, the communication system may optionally authenticate a caller at step 712 prior to receiving a message from the caller. Then, operation proceeds to step 714 wherein a message input screen is presented to the caller. Types of messages supported by the communication system include voice mail, text messages, faxes and document based messages, as well as other message input types. In response to the message input screen presented to the caller at step 714, the caller responds with one or more messages. These messages are received at step 716 and posted at step 718 for delivery to an intended caller or set of callers. Operation then proceeds to step 700.

Operation may also move from step 700 to deliver messages to a called party, to a number of called parties, or to a class of people to which the message is directed at step 720. From step 720, authentication of the caller seeking delivery of messages may be required at step 722. For example, if the communication system services a universal inbox, a caller may access the system to receive his messages. Such access made via a multimedia enabled device. Thus, at step 722, the system must determine whether the caller has rights to receive the messages requested. Password protection, voice recognition, or other techniques are employed to authenticate the caller.

From step 722 operation proceeds to step 724 wherein a message delivery screen is presented to the caller. The message delivery screen may identify messages received by the communication system intended for the caller. The caller may then select one or more messages from the message delivery screen presented at step 726. From step 726 operation proceeds to step 728 wherein the message or messages are delivered to the caller. Operation then proceeds again to step 700.

From the main operation at step 700 a caller may choose to post information to the communication system by proceeding to step 732. From step 732, the communication system may require authentication of the particular caller at step 730. Operation then proceeds to step 734 wherein the communication system presents an information input screen to the caller. The information input screen may include a number of different screens that have been established from which callers may deliver information to the system. Information that may be of interest to particular organizations include account numbers, product preferences, group communication discussions, preferences for delivery of calls, files, and other information that may be required by others having access to the communication system.

Based on the authentication determination at step 730 a particular set of screens may be used with respect to the caller. For example, the caller may be identified as a member of a group within an organization served by the communication system, a particular type of customer, a particular customer, or another caller or type of caller from which certain information is required. From step 734 operation proceeds to step 736 wherein the information is received. From step 736 operation proceeds to step 738 wherein the information is posted within the communication system for access by others. Alternatively, at step 738, the information can be compiled with other information and/or delivered to those destinations requesting such information upon its presentation.

From main operation at 700 a caller may choose to access information at step 740. The information that the caller desires to access may be that posted for general access such as product information available to a consumer, information with respect to the organization such as financial information, or other enterprise type information. However, the common information could be other information tailored for a particular class of callers of the communication system. Thus, at step 742 the system may authenticate the caller to determine the types of information the caller may access presented. Based upon the caller's selection and his or her identity, at step 744 a menu is presented to the caller from which the caller may select information. Then, upon receipt of the selection at step 746, the information is delivered at step 748. From step 748 operation proceeds again to step 700.

FIG. 7B illustrates further operations accessible from the main operation 700. From step 700 a caller may voluntarily seek authentication at step 750. However, step 750 may also be executed automatically by the communication system. From step 750 operation proceeds to step 752 wherein the communication system receives the caller's identification which may include, for example, the calling phone number, the location of the caller or the mobile identification number of a mobile unit from which the caller has called, for example. Then at step 754, the communication system receives a caller password, voice authentication, or other indication that the caller is authentic. Based upon this receipt, the communication system validates the password or other authentication at step 756 to authenticate the caller within the system. From step 756 operation proceeds to step 700.

Finally, from step 700 the caller may launch an application program so as to provide an application program interface to the caller at step 758. If the caller has not been previously authenticated, authentication is typically required at step 760. Then, at step 762, communication system launches the application program as is requested by the caller. The application program may be, for example, a spreadsheet program, a word processing program, a file management program, a calendar program or other programs which the caller requires to operate. The communication system then serves as an intermediary between the application program and the caller to provide interaction with the caller.

Such interaction may include, for example, editing a caller's calendar information with calendar program, to enter data into a particular file, to receive data, and to perform other functions via the application program. Other operations that may be accomplished via interface with an application program are to download files and perform data operation, to change passwords and other authentication information for the caller, to change characteristic of the caller's account on the system, to proved alternate numbers for the particular caller, to alter the contents of the caller's calendar, the perform administrative functions for the caller's voice mail, email, or fax mail box. Such operations may include, for example, to enter a "I am on vacation" or other data response to parties calling. The application program interface may also allow a caller to turn off particular message receiving capabilities for the caller and to otherwise administrate the caller's operation of the communication system.

As will be appreciated, a reduced number of available functions may be provided by the communication system to the caller. Such may be the case because of the lack of input capabilities of the caller's device. For example, JAVA based telephones may not provide significant interaction with an application program. Thus, consistent with the capabilities of the caller's interface, particular application program input functions are provided. When the caller has completed interacting with the program at step 764, operation proceeds to step 766 wherein the application program is closed. From step 766 operation proceeds again to step 700.

FIG. 8 illustrates a menu that may be provided to a caller at step 700 of FIG. 7. In the particular example, the menu coincides for the enterprise networks home page. The menu may be supported by HTTP/HTML, by HDTP/HTML or by another protocol and language combination. Thus, in an HTTP/HTML application, the underlined option items are accessed via hyper text links to URLs supported by the communication system. As indicated, the caller may select the options of Forward Call, Leave Message, Receive Messages, Post Information, Access Information, Launch Application or Hang Up. Upon executing any of the hyper text links presented in the menu 800, the communication system presents another menu to the caller and also performs such operations that have been specified by the selection.

FIG. 9 illustrates an interface 900 presented by the communication system of the present invention to a caller for delivering messages in delivering messages to an authenticated caller. As is shown, the interface 900 presents a client side interface for the universal inbox functions provided by the communication system of the present invention with the caller having been identified as John Doe. As was previously discussed, the communication system of the present invention couples to the Internet, LAN, WAN, PSTN, wireless networks and other transport mechanisms for communication. The functionality provided by the communication system includes universal inbox functions. In providing such universal inbox functions, the communication system brings together messages and other data that are in inconsistent media formats. However, the communication system provides a uniform interface for receipt of such messages. A particular previously discussed interface includes an interface compatible with HTTP/HTML and/or HDTP/HDML. Thus, a client of the communication system need not run specialized software to provide such universal inbox functions.

As is shown in the universal inbox interface 900, the caller may receive voice mail, email, faxes, and data files via the common interface. In receiving voice mail, the caller selects a hyper text link to voice mail 1 or voice mail 2. Upon selecting the links, the voice mail is delivered to the caller either in an audio fashion over a voice link, or is delivered in a data fashion for later playback by the caller. In delivering email to the caller, the caller selects one of the hyper links to email 1 or email 2. Upon selection, the communication system delivers the email to the caller over the supported communication protocol. In a similar fashion, fax 1 may be delivered over the common interface as well. Moreover, data files, spreadsheet file 1, word file 1, and data base file 1 may also be delivered to the caller over the common protocol interface.

FIG. 10 illustrates an interface 1000 provided by the communication system of the present invention to a caller, the interface 100 providing messaging functions. As shown, the interface 1000 provides the caller with options relating to leaving a message for John Doe who has a telephone number of (972) 684-8983. The interface 1000 is presented to a caller that: (1) attempted to call John Doe but that could not be connected to John Doe; (2) called a central number for the communication system, and linked to the interface 1000; (3) was routed to the interface 1000 when seeking a representative for a particular department or portion of an organization; or (4) otherwise was sent the interface 1000.

The interface 1000 provides two general types of options to the caller. First, the interface 1000 allows the caller to leave a message for John Doe from the LEAVE MESSAGE options. Options provide allow the caller to play a greeting, to leave voice mail, to leave email/text message, to leave a FAX or to leave video mail. Of course, in other embodiments, additional options may be provided which relate to leaving a message for John Doe. The other general type of options provided include Other Options which include viewing John Doe's schedule, viewing John Doe's project, viewing alternate contacts for John Doe, receiving John Doe's address information, routing the call to alternate contacts ad routing the call to a corporate operator. Of course, in other embodiments, other options may also be provided.

FIG. 11 illustrates an interface 1100 provided by the communication system of the present invention to a caller that has accessed a central receiving location of an organization. As is shown, the caller has accessed the ABC Company Sales Department, perhaps by dialing the telephone number (800) 999-9999. The interface 1100 presents a variety of options to the caller, including options under the general categories of Identification, Product Information and Other options. The caller may identify himself or herself by providing an Account Number, Caller Information Data or Agent Skill Requirements. Thus, the caller may identify himself or herself as a particular person or organization or may simply identify himself or herself as requiring particular skills, for example language skills, hearing impaired skills, or the like. The caller may also request Product Information. Particular options provided allow the caller to order products by catalog number, check stock/backorder status and alter current orders. The caller may also select other options including checking specials. However, in other embodiments, additional options may also be available to the user.

Because the caller is presented this screen when he or she is effectively on hold, the interface 1100 provides information relating to the status of the call. As is shown, the interface 1100 indicates to the user that there are 12 callers ahead of him and that an agent will pick up the call in approximately 4 minutes. In the embodiment illustrated, an attendant will respond to the call with a conversation unless the caller chooses otherwise. However, in another embodiment, the caller may choose to interact with the communication system directly without conversing with the attendant. In the embodiment illustrated, the caller may choose to leave a message in the queue for callback so that an attendant later returns the call.

In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

What is claimed is:

1. A communication system that supports both voice and data communications, the communication system comprising:

a voice subsystem that services voice communications and that receives a voice call from a caller via a first caller terminal, wherein the caller is attempting to complete the call to one of a plurality of called parties coupled to the voice subsystem;

a multimedia subsystem coupled to the voice subsystem that establishes a data communication with the caller;

wherein the multimedia subsystem establishes the data communication with the first caller terminal when the first caller terminal supports the data communication;

wherein the communication system establishes the data communication with a second caller terminal when the first caller terminal does not support the data communication; and wherein when the multimedia subsystem establishes the data communication, the multimedia subsystem transmits data to the caller that indicates a status of the voice call, caller identification, product information, and other options that the caller is attempting to complete to the called party.

2. The communication system of claim 1, wherein:

the voice subsystem couples to the first caller terminal via a first network connection; and the multimedia subsystem couples to the second caller terminal via a second network connection.

3. The communication system of claim 2, wherein:

the first network connection includes the Public Switched Telephone Network; and the second network connection includes the Internet.

4. The communication system of claim 1, wherein:
the voice subsystem comprises a switch capable of routing the voice call to one of the plurality of called parties coupled to the voice subsystem; and
the multimedia subsystem comprises a computer that monitors the status of the voice call that is intended for one of the plurality of destination voice terminals.

5. The communication system of claim 4, wherein the communication system services voice calls for a company.

6. The communication system of claim 1, wherein the voice subsystem further comprises a call processing and routing subsystem that routes and processes voice calls.

7. The communication system of claim 1, wherein the voice subsystem further comprises a messaging subsystem.

8. The communication system of claim 1, wherein the multimedia subsystem further comprises:
an information posting subsystem; and
an information access subsystem.

9. The communication system of claim 1, wherein the multimedia subsystem further comprises an application program interface subsystem that allows the caller to initiate execution of an application program stored on the multimedia subsystem.

10. A method for operating a communication system that supports both voice and data communications, the method comprising:
receiving a voice call from a caller that is using a first terminal, wherein the caller is attempting to complete the voice call to a called party of a plurality of called parties coupled to the communication system;
establishing a data communication with the caller, wherein the data communication is established with the caller via the first caller terminal when the first caller terminal supports the data communication, and wherein the data communication is established with the caller via a second caller terminal when the first caller terminal does not support the data communication; and
transmitting data to the caller that indicates a status of the voice call, caller identification, product information, and other options that the caller is attempting to complete to the called party.

11. The method of claim 10, wherein:
the voice call is serviced via a first network connection; and
the data communication is serviced via a second network connection.

12. The method of claim 11, wherein:
the first network connection includes the Public Switched Telephone Network; and
the second network connection includes the Internet.

13. The method of claim 10, further comprising routing the voice call to one of the plurality of called parties coupled to the communication system.

14. The method of claim 10, wherein the method services voice calls for a company.

15. The method of claim 10, further comprising taking a message when the voice call cannot be completed to one of the plurality of called parties coupled to the communication system.

16. The method of claim 10, further comprising:
receiving a data communication from the called party; and
posting the data communication from the called party in an information access subsystem.

17. The method of claim 10, further comprising initiating execution of an application program based upon a data communication from the caller.

18. A computer readable medium that is readable by a communication system and that stores a plurality of instructions that may be executed by the communication system, the computer readable medium comprising:
a set of instructions that, when executed by the communication system, cause the communication system to receive a voice call from a caller that is using a first terminal, wherein the caller is attempting to complete the voice call to a called party of a plurality of called parties coupled to the communication system;
a set of instructions that, when executed by the communication system, cause the communication system to establish a data communication with the caller, wherein the data communication is established with the caller via the first caller terminal when the first caller terminal supports the data communication, and wherein the data communication is established with the caller via a second caller terminal when the first caller terminal does not support the data communication; and
a set of instructions that, when executed by the communication system, cause the communication system to transmit data to the caller that indicates a status of the voice call, caller identification, product information, and other options that the caller is attempting to complete to the called party.

19. The computer readable medium of claim 18, further comprising:
a set of instructions that, when executed by the communication system, cause the communication system to service the voice call via a first network connection; and
a set of instructions that, when executed by the communication system, cause the communication system to service the data communication via a second network connection.

20. The computer readable medium of claim 18, further comprising a set of instructions that, when executed by the communication system, cause the communication system to route the voice call to one of the plurality of called parties coupled to the communication system.

21. The computer readable medium of claim 18, further comprising a set of instructions that, when executed by the communication system, cause the communication system to take a message when the voice call cannot be completed to one of the plurality of called parties coupled to the communication system.

22. The computer readable medium of claim 18, further comprising:
a set of instructions that, when executed by the communication system, cause the communication system to receive a data communication from the called party; and
a set of instructions that, when executed by the communication system, cause the communication system to post the data communication from the called party in an information access subsystem.

23. The computer readable medium of claim 22, further comprising a set of instructions that, when executed by the communication system, cause the communication system to allow subsequent callers to access the posted information.

24. The computer readable medium of claim 18, further comprising a set of instructions that, when executed by the communication system, cause the communication system to initiate execution of an application program based upon a data communication from the caller.

* * * * *